United States Patent [19]

Eichner

[11] Patent Number: 4,658,955
[45] Date of Patent: Apr. 21, 1987

[54] MAILER FOR RECORDING MEDIA

[75] Inventor: Falk J. Eichner, Coburg, Fed. Rep. of Germany

[73] Assignee: Eichner Organisation KG, Coberg, Fed. Rep. of Germany

[21] Appl. No.: 720,727

[22] Filed: Apr. 8, 1985

[30] Foreign Application Priority Data

May 26, 1984 [DE] Fed. Rep. of Germany ... 8416122[U]

[51] Int. Cl.⁴ .................. B65D 85/02; B65D 85/07
[52] U.S. Cl. ........................ 206/307; 206/1.5; 206/311; 206/312; 206/807; 292/307 R; 292/316
[58] Field of Search ............... 206/309–313, 206/303, 1.5, 807, 443, 444, 372, 307; 292/307 R, 316

[56] References Cited

U.S. PATENT DOCUMENTS

| 1,440,737 | 1/1923 | Jones | 206/312 |
| 2,028,423 | 1/1936 | Upham | 292/307 R |
| 2,954,119 | 9/1960 | Goldsholl | 206/312 |
| 3,556,575 | 1/1971 | Farkas | 292/307 R |
| 3,908,824 | 9/1975 | Takahara et al. | 206/312 |
| 4,106,801 | 8/1978 | De Lima Castro Neto | 292/307 R |
| 4,425,999 | 1/1984 | MacDonald et al. | 206/312 |

FOREIGN PATENT DOCUMENTS

| 2656511 | 6/1978 | Fed. Rep. of Germany | 292/307 R |
| 0629211 | 11/1927 | France | 292/316 |
| 0239870 | 4/1926 | United Kingdom | 292/307 R |
| 2072626 | 10/1981 | United Kingdom | 206/387 |
| 2089769 | 6/1982 | United Kingdom | 206/372 |

Primary Examiner—William Price
Assistant Examiner—Jimmy G. Foster
Attorney, Agent, or Firm—Chilton, Alix & Van Kirk

[57] ABSTRACT

A container for use in the mailing of flat recording media, discettes having computer programs or the like recorded thereon for example, comprises a pair of cover members which cooperate to define a pocket therebetween, at least two parts of these cover members being relatively movable with respect to each other to open and close the container. The relatively movable cover parts are provided with receivers for closure elements, the closure elements and the cover member receivers being designed such that once the container has been closed and the closure elements inserted the container may not be re-opened without destruction of the closure elements.

11 Claims, 4 Drawing Figures

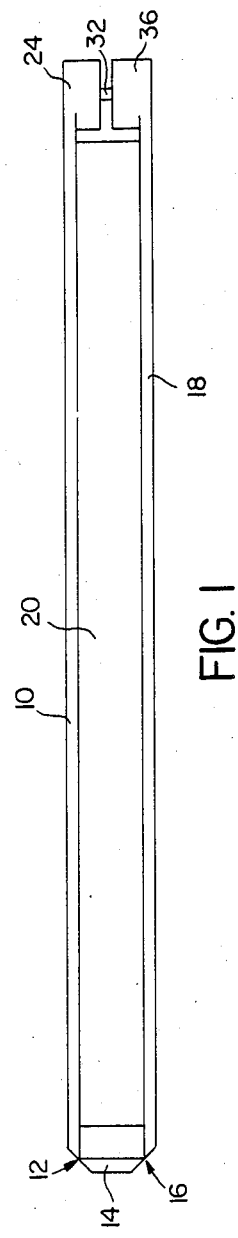
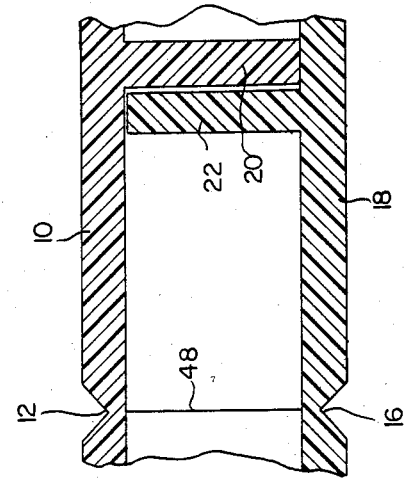
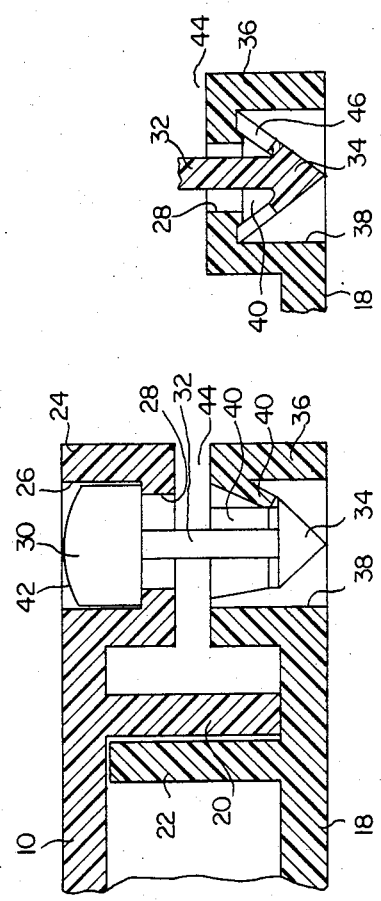

ively movable portions are designed so as to be capable of being locked together by at least one closure element. That closure element is characterized by the feature that once it has been installed it must be destroyed in order to permit the opening of the container. The closure element is also preferably characterized by being individualizable, i.e., it may be coded in some fashion so that, even if an identical closure element was available for resealing an improperly opened container, such other closure element would be visually different.

MAILER FOR RECORDING MEDIA

BACKGROUND OF THE INVENTION (1) Field of the Invention

The present invention relates to containers for recording media and particuarly mailers for use in the transmittal of discettes having machine readable information recorded thereon. More specifically, this invention is directed to enhancing the security of packages in which flat recording media, computer programs magnetically recorded on a discette for example, are transmitted from a seller to a buyer. Accordingly, the general objects of the present invention are to provide novel and improved apparatus and methods of such character.

(2) Brief Description of the Prior Art

It is often necessary or desirable to transmit, via the mails, discettes or other flat recording media. A recording media containing package, while in transit, is out of the control of both the sender and the intended receiver and accessible to many persons. Considering the case of a "floppy disc" containing a computer program as an example, many programs are provided with built-in copy protection. It is thus essential that the receiver of a mailed package containing a discette which has a computer program recorded thereon be able to immediately ascertain, by visual inspection, whether the package has been opened. Any such opening might have been incident to an attempt to copy the recorded data and the data may have been rendered unusable during the attempt to copy.

In the prior art, attempts to enhance the security of recording media while in the mails have largely been limited to the use of a sealed media containing envelope which was inserted in a mailer. The inner envelope would typically have to be destroyed in order to gain access to the recording media. This, however, cannot be determined without first opening the outer envelope or mailer which may have been violated and then resealed.

SUMMARY OF THE INVENTION

The present invention overcomes the above-briefly discussed and other deficiencies and disadvantages of the prior art by enhancing the security of mailers for use in the transmittal of flat recording media such as discettes, i.e., floppy discs. The present invention also encompasses novel packages which provide enchanced security for recording media and do not require the use of an additional inner envelope. Should a container or mailer in accordance with the present invention be opened by anyone other than the intended recipient, this fact will be immediately apparent upon visual inspection.

A container in accordance with the present invention is characterized by a closure element which must be destroyed in order to open the container. This closure element may, if deemed necessary or desirable, comprise an element which may be individualized by the application of a special pattern or the like thereto. A container in accordance with the invention is also characterized by ease of use and particularly ease of installation of the closure member once the recording media has been placed within the container.

In accordance with the present invention a container, i.e., a mailer, comprises of relatively movable top and bottom portions and an integral hinge assembly. These In the interest of minimizing expense, the present invention is fabricated entirely from plastic with the closure element being a relatively inexpensive injection molded part designed to have a pre-determined area in which it will break. Authorized opening of the container is, of course, possible when it is delivered to the intended receiver. Once the receiver accepts the container, and upon visual inspection determines that it has not been opened by an unauthorized party, all obligation to prevent unauthorized copying passes from the shipper to the receiver.

BRIEF DESCRIPTION OF THE DRAWING

The present invention may be better understood and its numerous objects and advantages will become apparent to those skilled in the art by reference to the accompanying drawing wherein like reference numerals refer to like elements in the several FIGURES and in which:

FIG. 1 is a side elevation view of a container in accordance with the present invention in the closed state;

FIG. 2 is an enlarged, partial, cross-sectional side elevation view of the container of FIG. 1, FIG. 2 having been taken in the same direction as the view of FIG. 1 and showing a closure element and the manner in which it cooperates with the container;

FIG. 3 is a view similar to FIG. 2 depicting, in part, a modification of the embodiment of FIGS. 1 and 2; and FIG. 4 is a partial, cross-sectional side elevation view of a container in accordance with another embodiment of the present invention.

DESCRIPTION OF THE DISCLOSED EMBODIMENTS

With reference now to the drawing, a container in accordance with the embodiments of FIGS. 1-3 is defined by a single injection molded plastic piece comprising a pair of cover parts 10, 18 which are interconnected, at first edges thereof, by a rear end wall 14 via a pair of integral hinges 12, 16. The cover members 10 and 18 are sufficiently rigid to protect a discette or other flat recording media positioned therebetween during mailing.

As may best be seen from FIG. 2, the cover members 10 and 18 are provided with transversely extending walls adjacent the free lateral edges thereof. Thus, cover member 10 has, extending transversely therefrom adjacent its edges, a pair of side walls and a front end wall, all three walls being indicated by reference numeral 20. The front wall 20 is parallel to the above-mentioned rear wall 14. The other cover member 18 is, in the disclosed embodiment, provided with a pair of side walls disposed inwardly from the edges thereof and a front end wall 22 which, as may be seen in FIG. 2, is disposed inwardly with respect to the front edge of member 18 and with respect to the front wall 20 of cover member 10. Accordingly, when the container is closed the envelope defined thereby will be of double-walled construction at the front and on two sides, the fourth or rear side being defined by the end member 14 and the integral hinges 12, 16. The double-walled arrangement makes it impossible to gain access to the interior of the container without either opening the container, in the manner to be described below, or causing very noticeable damage thereto. The double-walled construction also provides a high degree of protection to the contents against damage should the container be subjected to rough handling. The planar outer surfaces of the cover members 10 and 20 can be provided with address labels and the like.

A container in accordance with the present invention will typically have a generally rectangular configuration when viewed from the top, bottom or sides. Also, the hinges 12 and 16 will typically extend along the complete length of the rear side edges of the cover members 10 and 20. As shall be described below, means for locking the container in the closed position is preferably provided at or adjacent at least both of the free corners at the front edges of the cover members 10 and 18.

In the disclosed embodiment an inwardly extending projection 24 is provided at each corner of the front edge of cover member 10. The projections 24 have substantially the form of short cylinders which extend, with the container in the closed position, toward the other cover member 18. Each of projections 24 is provided with a cylindrical bore 26 of stepped configuration, i.e., the bore 26 has a portion 28 of reduced diameter which extends from the inwardly disposed end of the projection. The head 30 of a closure element is received within the larger diameter portion of bore 26 as shown in FIG. 2 and is stopped by the shoulder defined by the junction of the two different bore diameters. The closure element further comprises a shaft portion 32 which extends from the head 30. The shaft portion 32 terminates at an inserter portion 34 which is of conical shape in the FIG. 2 embodiment. The closure element is also an injection molded piece and the shaft portion 32 thereof comprises the portion of minimum strength, i.e., when subjected to sufficient longitudinal force the shaft 32 will break.

The cover member 18 is also provided with a projection or projections 36 which, with the container closed, are in registration with the projection or projections 24 on cover member 10. The projections 36 are provided with a cylindrical bore 38. In the FIG. 2 embodiment a plurality of integral resilient locking fingers 40 extend downwardly and inwardly with respect to the end of bore 38 which is in closest proximity to the projection 24. In the embodiment of FIGS. 1 and 2 three of the locking fingers 40 are provided. The locking fingers 40 are, as noted, integral with the projection 36 and thus are integral with the cover member 18.

The inserter portion 34 of the closure element has, in the embodiment of FIG. 2, a conical shape. The maximum diameter of inserter portion 34, where it joins shaft portion 32, is less than the diameter of portion 28 of bore 26 but greater than the minimum diameter of the opening defined by the free ends of the fingers 40. Accordingly, when the closure element is installed the urging of the inserter portion 34 between the fingers 40 will cause the fingers to flex outwardly and, when the closure element is fully installed, the fingers 40 will snap back to their original position and lock above the upper end of the inserter portion 34. Thus, with the closure element installed as shown in FIG. 2, the container can be opened only by destroying the closure element.

The facing surfaces of the projections 24 and 36, respectively of the cover members 10 and 18, are separated by a gap 44, i.e., the projections are of shorter length than the lateral side walls 20 and 22. The container can be opened by inserting a coin or the like into the gap 44 and subsequently twisting the coin. The twisting action will generate sufficient force to break the shaft portion 32 thus destroying the closure element and permitting opening of the container.

The outwardly disposed surface 42 of head 30 of the closure element provides a region in which individual patterns can be applied. Thus, a seal, color coding or any other form of suitable indicia can be imprinted on the closure element. This enhances security since it is highly unlikely that a party tampering with the container would have available a replacement closure element of exactly the same size and shape which also had the same identifying markings on the surface of the head portion thereof.

It is preferable, as shown in FIG. 2, that the closure elements be accommodated completely in the bores 26 and 38 and thus not extend outwardly from the planes of the upper and lower surfaces of the container.

The embodiment of FIG. 3 differs from that of FIG. 2 in that the bore 38 in projection 36 is, as in the case of the bore 26 in projection 24 of the embodiment of FIG. 2, provided with a portion 28' of reduced diameter at the inwardly disposed end. In the embodiment of FIG. 3 the resilient fingers 40 are eliminated. In their place, the inserter portion 34 of the closure element is provided, extending inwardly and upwardly from the end of the conical portion thereof, with a plurality of resilient fingers 40 separated by gaps 46. These fingers flex inwardly during passage of the inserter portion through the reduced diameter portion 28' of the bore 38 and then snap outwardly to lock the closure element in position. As shown in FIG. 3, an annular shoulder may be provided about the end of the smaller diameter portion 28' of the bore 38 and the free ends of the fingers 40 will snap into the annular groove defined by this shoulder to enhance the locking action. In the FIG. 3 embodiment either the fingers 40 or the shaft 32 can be designed to be the weakest part of the closure element, i.e., the part which will break pursuant to the opening of the container.

The FIG. 4 embodiment differs from the embodiments of FIGS. 1–3 in that the relative position of the major portions of the cover members 10 and 20 is fixed and only a portion of one or both of the cover members 10 and 18 adjacent the front edge thereof is hinged to permit the opening and closing of the container. Thus, the container of the FIG. 4 embodiment is a box-like mailer wherein the cover elements 10 and 18 are provided with respective hinges 12 and 16 to permit portions thereof to be opened. If only one of the members 10 and 18 is provided with a hinge, the front wall of one of the members must be omitted. Thus, for example, if hinge 16 is omitted the front wall 22 of cover member 18 will also be omitted. The side walls, of course, will also have to be provided with cuts, as indicated at 48, to permit the pivoting movement of the portion or portions of the cover members 10 and/or 18, the cuts 48 being aligned with the integral hinges 12 and/or 16. Also, if only one of the cover members is provided with a hinged joint, so that a edge portion thereof may be rotated out of the plane of the remainder of the cover member, typically there will be projections (24 or 36) on only on one of the cover members. For example, if hinge 16 is omitted, projection 36 will also be omitted and the length of projection 24 increased. The operation of the embodiment of FIG. 4 is otherwise the same as that described above and a closure element of the type shown in either of FIGS. 2 or 3 may be utilized in the embodiment of FIG. 4.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A container for use in the shipping of flat recording media comprising:

means defining a recording media receiving pocket, said pocket defining means including a pair of cover members, at least part of one of said cover members being moveable relative to the other cover member between an opened and a closed condition by means of an integral hinge assembly to permit access to the media receiving pocket located therebetween;

receiver means, said receiver means being integral with said pocket defining means, said receiver means being positioned on said relatively movable portion of said cover members, said receiver means defining a pair of bores which are in registation with said container in the closed condition, wherein said bores each has a stepped effective diameter, the smaller diameter portions of the bores being adjacent to one another with the container in the closed position, wherein said receiver means further comprises a projection on each of said cover members, said projections extending toward one another, said bores being formed in said projections, a gap being provided between the facing ends of said projections with the container in the closed condition; and a closure element for said pair of bores, the closure element being recieved in said registered bores and permanently engaging said relatively movable members so that said container may not be opened without destruction of said closure element, said closure element being of one-piece construction comprising a head portion, an inserter portion , and a shaft interconnecting said head and inserter portions, said shaft providing a predetermined breaking area, the head and inserter portions of said closure element respectively being received in the larger diameter portions of the bores in said receiver means.

2. The container of claim 1 wherein said closure element inserter portion increases smoothly in effective diameter from the free end thereof shape and wherein the diameter of said closure element head is at least equal to the maximum diameter of said inserter portion.

3. The container of claim 2 wherein said closure element includes an indicia receiving surface whereby said closure elements may be provided with a unique identification.

4. The container of claim 2 wherein said smaller diameter portion of said bore on the one of said cover members which receives the inserter portion of said closure element is defined by a plurality of integral resilient fingers which extend outwardly and in the direction of travel of said closure element during insertion, said fingers snapping over and engaging the top of the inserter portion of said closure element to permanently capture said closure element.

5. The container of claim 4 wherein said cover members are joined an integral hinge assembly along a pair of first edges thereof and wherein said receiver means are arranged adjacent a second opposite edge thereof.

6. The holder of claim 4 wherein the bore that receives the inserter portion of said closure element extends to the outer surface of the receiver means.

7. A container for use in the shipping of flat recording media comprising:

means defining a recording media receiving pocket, said pocket defining means including a pair of cover members, at least part of one of said cover means being movable relative to the other cover member an opened and a closed condition by means of an integral hinged assembly to permit access to the media receiving pocket located therebetween;

receiver means, said receiver means being integral with said pocket defining means, said receiver means being positioned on said relatively movabe part of said cover members, said receiver means defining a pair of bores which are in registration with said container in a closed condition, wherein said bores each has a stepped effective diameter, the smaller diameter portions of the bores being adjacent to one another with the container in the closed position; and a closure element for said pair of bores, the closure element being received in said registered bores and permanently engaging said relatively movable members so that said container may not be opened without destruction of said closure element, said closure element being of one-piece construction comprising a head portion, an inserter portion, and a shaft interconnecting said head and inserter portions, said shaft providing a predetermined breaking area, the head and inserter portions of said closure element respectively being received in the larger diameter portions of the bores in said receiver means, said head and inserter portions each having a larger effective diameter than the smaller effective diameter portion of both bores and said shaft having a length at least as long as the total combined length of said smaller effective diameter portions.

8. The container of claim 7 wherein said cover members are joined an integral hinge assembly along a pair of first edges thereof and wherein said receiver means are arranged adjacent a second opposite edge thereof.

9. The container of claim 8 wherein said pocket defining means has a pair of spaced side walls on at least two opposite sides thereof, one of said side walls of each pair being integral with and extending generally transversely from one of said cover members.

10. The container of claim 7 wherein said closure element inserter portion increases smoothly in effective diameter from the free end thereof shape and wherein the diameter of said closure element head is at least equal to the maximum diameter of said inserter portion.

11. The container of claim 7 wherein said pocket defining means has a pair of spaced side walls on at least two opposite sides thereof, one of said side walls of each pair being integral with and extending generally transversely from one of said cover members.

* * * * *